(12) United States Patent
Anflo et al.

(10) Patent No.: US 7,976,653 B2
(45) Date of Patent: Jul. 12, 2011

(54) AMMONIUM DINITRIMIDE BASED LIQUID MONOPROPELANTS EXHIBITING IMPROVED COMBUSTION STABILITY AND STORAGE LIFE

(75) Inventors: Kjell Anflo, Haninge (SE); Niklas Wingborg, Stockholm (SE)

(73) Assignee: Svenska Rymdaktiebolaget, Solna (SE)

( * ) Notice: Subject to any disclaimer, the term of this patent is extended or adjusted under 35 U.S.C. 154(b) by 1147 days.

(21) Appl. No.: 10/478,407

(22) PCT Filed: May 23, 2002

(86) PCT No.: PCT/SE02/00988
§ 371 (c)(1),
(2), (4) Date: Jun. 14, 2004

(87) PCT Pub. No.: WO02/096832
PCT Pub. Date: Dec. 5, 2002

(65) Prior Publication Data
US 2004/0231765 A1 Nov. 25, 2004

(30) Foreign Application Priority Data
May 28, 2001 (SE) ........................................ 0101751

(51) Int. Cl.
C06B 47/00 (2006.01)
C06B 45/00 (2006.01)
C06B 31/00 (2006.01)
C06B 25/00 (2006.01)
C06B 43/00 (2006.01)
C06D 5/00 (2006.01)
C06D 5/04 (2006.01)

(52) U.S. Cl. .................... 149/88; 149/1; 149/2; 149/45; 60/217; 60/218
(58) Field of Classification Search ................ 149/1, 45, 149/36; 60/217, 218
See application file for complete search history.

(56) References Cited

U.S. PATENT DOCUMENTS

| 3,066,479 | A | * | 12/1962 | Koch, Jr. ........................ 60/212 |
| 3,172,793 | A | * | 3/1965 | Markowitz .................. 149/19.1 |
| 3,696,616 | A | * | 10/1972 | Lucas et al. ..................... 60/218 |
| 5,780,769 | A | | 7/1998 | Russell et al. |
| 6,113,712 | A | * | 9/2000 | Ciaramitaro et al. ........ 149/19.6 |
| 6,136,115 | A | | 10/2000 | Highsmith et al. |
| 6,254,705 | B1 | * | 7/2001 | Anflo et al. ...................... 149/1 |
| 6,984,273 | B1 | * | 1/2006 | Martin et al. ..................... 149/1 |

FOREIGN PATENT DOCUMENTS
WO WO 99/52839 10/1999
WO WO 00/50363 8/2000
WO WO0109063 A2 8/2001

OTHER PUBLICATIONS

Oxley et al., Thermal decomposition studies on ammonium dinitramide (AND) and 15N and 2H isotopomers. J. Phys. Chem. A 1997, 101, 5646-5652.*

* cited by examiner

Primary Examiner — Jerry Lorengo
Assistant Examiner — Jennifer A Smith
(74) Attorney, Agent, or Firm — Browdy and Neimark, PLLC

(57) ABSTRACT

Ammonium dinitramide based liquid monopropellants exhibiting stabilised combustion characteristics and improved storage life, containing ammonia, a base weaker than ammonia, or a base which is sterically hindered, added in an amount of 0.1 to 5% of the total weight of the other components of the propellant.

18 Claims, 1 Drawing Sheet

AMMONIUM DINITRIMIDE BASED LIQUID MONOPROPELANTS EXHIBITING IMPROVED COMBUSTION STABILITY AND STORAGE LIFE

The present invention relates to ammonium dinitramide based liquid monopropellants exhibiting improved combustion characteristics for the purpose of generating hot gases. These gases are especially suited for rocket propulsion or other vessel or vehicle propulsion, or gas generation. More particularly the present invention relates to such propellants especially suited for space applications.

BACKGROUND OF THE INVENTION

Ammonium dinitramide (ADN) is a solid oxidiser, mainly intended for high performance composite rocket propellants. ADN and other similar compounds are the subject of several patents for application as solid composite rocket propellants and as explosives, both for pyrotechnic applications in general and for other uses, such as in inflators for air-bags.

U.S. Pat. No. 6,113,712 describes stabilisers of ADN. The stabilisers increase the thermal stability and the shelf or service life of the ammonium dinitramide and increase the reliability of the formulations incorporating ADN over extended periods of time and/or after exposure to temperature changes. The use of hexamethylenetetramine (hexamine) to stabilise ADN, under certain conditions, is said to lead to instability and degraded performance and/or safety characteristics in the formulation, either in storage or use. The specification does not mention stabilisation of liquid solutions of ADN.

Published international patent application WO-0050363 discloses a new type liquid monopropellant, which is low-hazardous both from a handling point of view and from an environmental point of view, and does not develop smoke. Such propellant should exhibit the following properties; low toxicity, low flamability, higher theoretical specific impulse (as compared to hydrazine), higher density (as compared to hydrazine), easily ignitable, by means of a controlled ignition mechanism, storable at a temperature between −10 and +70° C., preferably +10 and +50° C., and low sensitivity. Examples of compositions containing ammonium dinitramide, fuel and water are given and shown to have a high specific impulse.

According to the above publication it is also possible to include additives in the propellant. As an example the publication generally states that, since ADN is not stable in acidic environment, small amounts of a suitable base might be added in order to stabilise the dinitramide.

For the purpose of orbit maneuvering and attitude control of satellites and other space vehicles, rocket engines are often used in short bursts or pulses, the duration of which typically can be fractions of seconds to several minutes. For such purposes small rockets are commonly used with a thrust of, for example, 1 to 50 N. Especially in such applications it is important that the combustion in the engine is stable, i.e., for example, does not exhibit fluctuating pressure characteristics in the reaction chamber. Stabile combustion conditions should preferably be established instantaneously after ignition of the propellant, or at least combustion conditions should only change slowly in a predictable way, so as to readily be able to be compensated for.

Accordingly, it would be desirable to have a suitable propellant for such purposes available, which propellant also should exhibit the above-mentioned desired characteristics of the above-mentioned liquid monopropellant.

According to the present invention this task is solved by providing a propellant of the preamble of claim 1, exhibiting the features of the characterising portion of claim 1.

SUMMARY OF INVENTION

The present inventors have now surprisingly found that by adding a specific base to a liquid monopropellant formulation, comprising a solution of ammonium dinitramide, a fuel and water, stabilised combustion characteristics are obtained.

An improved storage life, i.e. stability to storage under elevated temperatures, is also achieved by means the addition of the base according to the invention to the propellant.

Also, the observed stabilisation does not seem to be directly related to the pH of the thus stabilised propellant.

The monopropelllant, and notably the AND used, should be of highest possible purity, as this will reduce any poisoning of the catalyst catalysing the decomposition of the propellant. High purity will thus further improve the stability of combustion. For example, contaminants in the form of non-volatile residues, such as for examples iron, potassium and chlorine, should be kept low, such as no more than 50 ppm by weight, more preferably no more than 1 ppm by weight.

Further advantages of the invention will be evident from the dependent claims and the following detailed description.

BRIEF DESCRIPTION OF THE ATTACHED DRAWINGS

DETAILED DESCRIPTION

The fuels that can be used in the present invention are the same as those already mentioned in WO-0050363 and must be able to be combusted with the ammonium dinitramide oxidiser, and the optional solvent, such as water and/or hydrogen peroxide, as well as to form a liquid monopropellant. Such fuels can be selected from the group consisting of mono-, di-, tri- and poly-hydric alcohols, aldehydes, ketones, amino acids, carboxylic acids, primary, secondary and tertiary amines, and mixtures thereof.

To prevent ion exchange with the dissolved ADN, the base used as a combustion stabilising agent according to the present invention should preferably be a base weaker than ammonia, or a base that is sterically hindered. This is in order to prevent the $NH_4+$ cation from escaping from the propellant in the form of ammonia, thereby leaving the dinitramide anion balanced by other cation species. As a consequence, the solubility characteristics of any constituents could possibly also be altered, and there could be a risk of any undesired precipitation. Thus, while ammonia could be used as a stabiliser, as shown in FIG. 1, the use of this base is not preferred.

Figure 1:
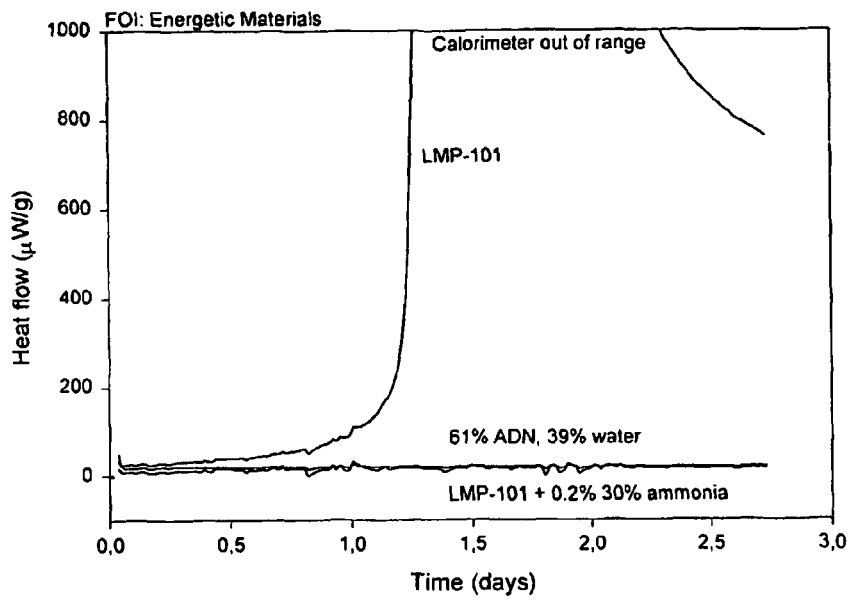
FIG. 1 shows the heatflow as function of the time measured in a microcalorimeter for a non-stabilised propellant composition, LMP-101, and the propellant stabilised with in this case ammonia.

With reference to FIG. 1, the improved storage life of a propellant composition of the invention, i.e. modified LMP-101, consisting of 61% of ADN, about 26% of water, and about 13% by weight of glycerol, to which 0.2% by weight of aqueous ammonia has been added, can clearly be seen, as compared to the storage life of normal LMP-101.

Examples suitable bases are: hydrazine, hydroxylamine, urea, ethyleneimine, allantoin, pyridine, 2-, 3-, and 4-methylpyridine, 2- and 4-pyridineamine, 2,5-pyridinediamine, 2,3-, 2,4-, 2,5-, 2,6-, 3,4- and 3,5-dimethylpyridine, 2-ethylpyridine, 2,4,6-trimethylpyridine, 4,6-dimethylpyrimidinamine, methoxypyridine, imidazole, 2,4-dimethylimidazol, quinoline, naphtylamine, N,N-dimethylcyclohexylamine, N-ethyldiisopropylamine and hexamethylenetetramine (hexamine). It is preferred that the base used should not be prone to separate from the propellant, such as by evaporation.

The presently preferred bases are hexamine and urea. Urea tends to be more efficient hexamine. The mechanisms underlying the stabilisation are believed not to be primarily connected to the pH of the stabilised propellant, since the pH in some stabilised propellant compositions is not altered by the added base.

The amount of base to be used for stabilisation according to the invention will be dependent on i.a. whether said base also will perform the function of a fuel. Accordingly, a base that will also perform the function of a fuel can be used in larger amounts without severely reducing the characteristics of the propellant. For example, at an added amount of base, corresponding to about 5% of the total weight of the other components, the function of a fuel of the base becomes a concern, in order not to undesirably reduce the characteristics of the propellant.

According to the present invention the base is generally used in amount of 0.1 to 5, and more typically 0.5-3%, preferably 0.5-1%, based upon the total weight of the other components.

It has been found that an amount of 0.5% of the base is usually sufficient for stabilising the monopropellant for storage under at least 17 days at a temperature of 65° C. (the test was discontinued after 17 days).

Specific examples of compounds usable as the fuel in the stabilised propellant composition are polyhydric alcohols such as ethylene glycol, glycerol, erythritol, diethylene glycol, triethylene glycol, tetramethylene glycol, ethylene glycol monoethyl ether, propylene glycol, dipropylene glycol, dimethoxytetraethylene glycol, diethylene glycol monomethyl ether, the acetate of ethylene glycol monoethyl ether and the acetate of diethylene glycol monoethyl ether; ketones, such as for example, acetone, methyl butyl ketone and N-methyl pyrrolidone (NMP); monohydric alcohols such as methanol, propanol, butanol, phenol and benzyl alcohol; ethers, such as dimethyl and diethyl ether, and dioxane; also, the nitriles such as acetonitrile; the sulfoxides such as dimethylsulfoxides; formamides such as N,N-dimethylformamide, N-methylfomamide; sulfones such as tetrahydrothiophene-1,1-dioxide; the amines such as ethylamine, diethylamine, ethanolamine, hydroxylamine; substituted hydroxylamines such as methyl and ethyl hydroxylamine; and any mixtures thereof. Polar fuels are preferred for their ability to dissolve the dinitramide salt.

The specific impulse for a given propellant is a qualitative measure of the impulse generated by one unit of mass of the specific propellant under certain standard engine conditions. The specific impulse is, i.a., related to the pressure and temperature inside the engine, the composition and thermodynamic properties of the combustion products, the ambient pressure, and the expansion ratio. Accordingly, it is preferred that the propellant of the invention has as high specific impulse as possible. In this regard, it is also important that the propellant compositions according to the invention preferably should exhibit an as high volume specific impulse as possible, since thereby, the system specific impulse, i.e. the delivered impulse per unit mass of the total propulsion system, will also be maximal.

Preferred examples of the fuel in the stabilised monopropellant are alcohols, amino acids, and ketones, a suitable example of an amino acid being glycine. Also, ammonia (aqueous) can be used. By way of example a preferred ketone is acetone. More preferably, alcohols usable in the present invention are linear or branched lower alcohols comprising from 1 to 6 carbon atoms. Specific examples of the latter are any of the isomers of methanol, ethanol, ethanediol, propanol, isopropanol, propanediol, propanetriol, butanol, butanediol, e.g. 1,4-butanediol, butanetriol, pentanol, pentanediol, pentanetriol, pentaerythritol, hexanol, hexanediol, hexanetriol, trimehylolpropane.

Especially preferred fuels are represented by methanol, ethanol, acetone, glycine, and glycerol, of which methanol and glycerol are more preferred. Methanol is the most preferred fuel in the stabilised propellant.

More specifically, a preferred propellant composition according the invention containing water, and fuel, exhibits a composition ranging from 15 to 55% by weight of the fuel in solvent mixture (solvent mixture=water+fuel), and a more preferred composition from 10 to 50% by weight of fuel in solvent mixture, and even more preferably, 25 to 45% by weight of fuel in solvent mixture, to which a stabiliser is added in an amount of 0.1 to 5, and more typically 0.5-3%, preferably 0.5-1%, and most preferably 0.5%, based upon the total weight of the other components.

Accordingly, the most preferred monopropellants are stabilised compositions of ADN, water, and glycerol, or ADN, water, and methanol.

In the case of methanol, a composition consisting of about 64.3% ammonium dinitramide, about 24.3% water and about 11.4% by weight of methanol (in the following called LMP-103), to which a stabiliser is added in the above mentioned amount, is especially preferred.

In the case of glycerol, a composition of about 61.0% of ADN, about 26.1% of water, and about 12.9% by weight of glycerol, to which composition a stabiliser is added in the above mentioned amount, is especially preferred.

The above methanol composition is the most preferred.

As will be obvious to the person skilled in the art, the preferred composition of a specific propellant of the invention will, inter alia, be dependent upon the temperature selected at which the solution will be saturated. Said temperature should be selected so that the propellant will be storable and usable at a selected minimum temperature without the precipitation of any component thereof.

Additional water can be added in order to increase the solubility of ADN in a liquid fuel. Solid fuels might also be used as long as they dissolve in ADN/water solutions.

To lower the flame temperature and/or the sensitivity of the specific propellant, the amount of water can be increased. However, increasing the amount of water will lower the specific impulse of the propellant. In order to reduce the extent of lowering of the impulse due to the addition of water, some of the water can be substituted with hydrogen peroxide, having a comparable polarity to that of water. It is believed that the hydrogen peroxide will act as an additional oxidiser, and, will thus allow for a corresponding additional amount of fuel to be added to the propellant. As will be realised by the person skilled in the art, the amount of hydrogen peroxide used, if any, will be governed by the stability during storage and handling of the propellant obtained therewith.

When operating an engine on a propellant not containing the combustion stabilising agent according to the invention, the reaction chamber pressure of the engine has been found to fluctuate, as clearly will be seen from the comparative example below. This behaviour is highly undesirable. One of the primary negative effects caused by combustion instability is oscillation of the engine and its parts and possibly also of the vehicle. This will mean that energy is being lost from the combustion to the oscillation of the material of the engine and vehicle system, and can consequently lead to enormous amount of wear to the different parts of the system. Depending on the frequency range of the combustion instability, different kinds of oscillation can result. Naturally, this oscillation will be very pronounced when resonance is reached. Thus, excessive oscillation can for example be obtained when both the vehicle structure and the propulsion structure have about the same natural frequency. The mechanisms underlying the observed fluctuations in pressure and the stabilising phenomenon is however not fully understood. In the art, it is conventionally recognised that combustion instability of liquid propellants is linked with the design of the engine and the vehicle, such as the elastic nature of the feed systems and structures of the vehicle, propellant pump cavitation (see e.g. the chapter on Combustion Instability in Sutton, G. P., Rocket propulsion elements, John Wiley and Sons, Inc., 1992, pp 268-275).

As will be seen from the examples of the invention below, this fluctuating behaviour is substantially reduced by the addition of the base according to the invention.

EXAMPLES

In the examples, propellant compositions without and with the combustion stabilising agent according to the invention were tested in a small engine (about 10 N).

Comparative Example

Figure 2:
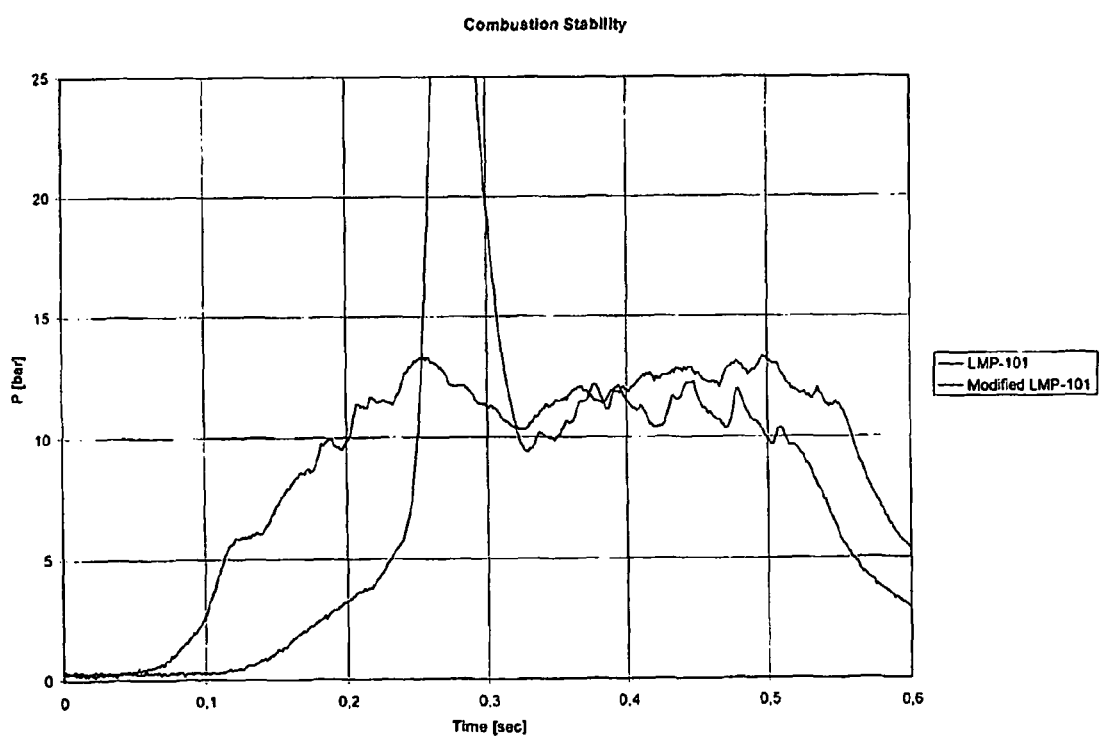
FIG. 2 shows the chamber pressure as a function of time for a non-stabilised propellant composition, LMP-101 and the propellant of the invention, the modified LMP-101.

A propellant composition consisting of 61% of ADN, 26% of water, and 13% by weight of glycerol, referred to as LMP-101, was tested in this example. LMP-101 was tested in an experimental rocket engine. Several 0.5 second test firings were performed, of which one is shown in FIG. 2. The preheating of the reactor bed of the engine was about 400° C.

As can be seen from FIG. 2, a desirable stable combustion was not obtained, and a spike in the chamber pressure resulted.

Example

A propellant composition according to the invention was tested, comprising 61% of ADN, 26% of water, and 13% by weight of glycerol, to which 1% hexamine was added, referred to as modified LMP-101. Several 0.5 second test firings were performed whereof one is shown in FIG. 2. The preheating of the reactor bed was about 400° C.

From the figure it is clear that the chamber pressure was markedly stabilised, as compared to the previous runs without any stabilising agent. Consequently, the combustion efficiency is increased. The other runs resulted in similar behaviour.

A combination of bases are also possible within the teaching of the present invention.

The invention claimed is:

1. An aqueous liquid monopropellant formulation exhibiting improved combustion stability and storage life, comprising
a solution of ammonium dinitramide, a fuel and water, characterised in that
the formulation also contains a stabilising agent, selected from ammonia, a base weaker than ammonia, or a base which is sterically hindered,
added in an amount of 0.1 to 5% of the total weight of the other components of the propellant,
with the proviso that the liquid monopropellant formulation does not contain hydrazine.

2. The liquid propellant of claim 1, characterised in that the stabilising agent is selected from hydroxylamine, urea, ethyleneimine, allantoin, pyridine, 2-, 3- and 4-methylpyridine, 2- and 4-pyridineamine, 2,5-pyridinediamine, 2,3-, 2,4-, 2,5-, 2,6-, 3,4- and 3,5-dimethylpyridine, 2-ethylpyridine, 2,4,6-trimethylpyridine, 4,6-dimethylpyrimidinamine, methoxypyridine, imidazole, 2,4-dimethylimidazol, quinoline, naphthylamine, N,N-dimethylcyclohexylamine, N-ethyldiisopropylamine, and hexamethylenetetramine (hexamine).

3. The liquid propellant of claim 1, characterised in that the stabilising agent is hexamine or urea.

4. The liquid propellant of claim 1, characterised in that the fuel is selected from the group consisting of mono-, di-, tri-, and polyhydric alcohols, aldehydes, ketones, carboxylic acids, ethers, nitriles, sulfoxides, formamides, sulfones, primary, secondary and tertiary amines, amino acids, saturated liquid hydrocarbons, and any mixture thereof.

5. The liquid propellant as claimed in claim 1, characterised in that the fuel is selected from the group consisting of methanol, glycine and glycol.

6. The liquid propellant as claimed in claim 1, characterised in that 0.5-5% of the stabilising agent, based on the total weight of the other components, is added.

7. A method for stabilising the combustion characteristics of an aqueous liquid monopropellant formulation comprising a solution of ammonium dinitramide, a fuel and water, comprising adding to said formulation a stabilizing agent to obtain the liquid monopropellant according to claim 1.

8. The liquid propellant of claim 6 wherein said stabilizer is present in an amount of 0.5-3%.

9. The liquid propellant of claim 6 wherein said stabilizer is present in an amount of 0.5-1%.

10. The liquid propellant of claim 1 wherein said stabilizer is present in an amount of about 0.5%.

11. An aqueous liquid monopropellant formulation exhibiting improved combustion stability and storage life, comprising
a solution of ammonium dinitramide, a fuel and water, characterised in that
the formulation also contains ammonia as a stabilizing agent in an amount of 0.1 to 5% of the total weight of the other components of the propellant,
with the proviso that the liquid monopropellant formulation does not contain hydrazine.

12. The liquid propellant of claim 11, characterised in that the fuel is selected from the group consisting of methanol, mono-, di-, tri-, and polyhydric alcohols, aldehydes, ketones, carboxylic acids, ethers, nitriles, sulfoxides, formamides, sulfones, primary, secondary and tertiary amines, amino acids, saturated liquid hydrocarbons, and any mixture thereof.

13. The liquid propellant as claimed in claim 11, characterised in that the fuel is selected from the group consisting of methanol, glycine and glycol.

14. The liquid propellant as claimed in claim 11 wherein said ammonia is present in an amount of 0.5-5% based on the total weight of the other components.

15. The liquid propellant of claim 11 wherein said ammonia is present in an amount of 0.5-3%.

16. The liquid propellant of claim 11 wherein said ammonia is present in an amount of 0.5-1%.

17. The liquid propellant of claim 11 wherein said ammonia is present in an amount of about 0.5%.

18. A method for stabilising the combustion characteristics of an aqueous liquid monopropellant formulation comprising adding ammonia to the liquid monopropellant formulation as a stabilizing agent to provide a stabilized liquid monopropellant formulation according to claim 11.

* * * * *